United States Patent
McNicoll et al.

(10) Patent No.: US 8,238,095 B2
(45) Date of Patent: Aug. 7, 2012

(54) SECURE CIRCUIT BOARD ASSEMBLY

(75) Inventors: Grant A. McNicoll, Angus (GB);
 Charles Harrow, Dundee (GB); Ian J. Walker, Fife (GB)

(73) Assignee: NCR Corporation, Duluth, GA (US)

( * ) Notice: Subject to any disclaimer, the term of this patent is extended or adjusted under 35 U.S.C. 154(b) by 340 days.

(21) Appl. No.: 12/551,097

(22) Filed: Aug. 31, 2009

(65) Prior Publication Data

US 2011/0055086 A1 Mar. 3, 2011

(51) Int. Cl.
 *H05K 7/00* (2006.01)
 *H05K 1/14* (2006.01)
 *H05K 5/00* (2006.01)
 *H02B 1/20* (2006.01)
 *H02B 1/00* (2006.01)

(52) U.S. Cl. .............. 361/679.57; 361/654; 361/672; 361/737; 361/758

(58) Field of Classification Search .......... 361/720, 361/736, 737, 760, 741, 761, 764, 767, 679.57, 361/654, 672, 758; 713/193, 194
See application file for complete search history.

(56) References Cited

U.S. PATENT DOCUMENTS

| | | | | |
|---|---|---|---|---|
| 4,991,927 A * | 2/1991 | Anstey | ............. | 385/53 |
| 6,143,989 A * | 11/2000 | Greenbaum | ............. | 174/250 |
| 6,166,911 A * | 12/2000 | Usami et al. | ............. | 361/737 |
| 6,592,031 B1 * | 7/2003 | Klatt | ............. | 235/382 |
| 6,724,894 B1 * | 4/2004 | Singer | ............. | 380/28 |
| 6,748,535 B1 * | 6/2004 | Ryan et al. | ............. | 713/189 |
| 6,895,509 B1 * | 5/2005 | Clark | ............. | 726/23 |
| 7,296,735 B2 * | 11/2007 | Tennant | ............. | 235/379 |
| 2001/0026203 A1 * | 10/2001 | Van Zeeland | ............. | 335/205 |
| 2001/0044777 A1 * | 11/2001 | Haley et al. | ............. | 705/43 |
| 2002/0054486 A1 * | 5/2002 | Miyajima et al. | ............. | 361/803 |
| 2002/0137365 A1 * | 9/2002 | McGrath et al. | ............. | 439/71 |
| 2003/0014370 A1 * | 1/2003 | Charrin | ............. | 705/65 |
| 2003/0084303 A1 * | 5/2003 | Neubauer | ............. | 713/185 |
| 2004/0083380 A1 * | 4/2004 | Janke | ............. | 713/194 |
| 2005/0168339 A1 * | 8/2005 | Arai et al. | ............. | 340/572.8 |
| 2005/0243532 A1 * | 11/2005 | Wang et al. | ............. | 361/797 |
| 2007/0150749 A1 * | 6/2007 | Monaghan et al. | ............. | 713/189 |

* cited by examiner

*Primary Examiner* — Timothy Thompson
*Assistant Examiner* — Sherman Ng
(74) *Attorney, Agent, or Firm* — Michael Chan

(57) ABSTRACT

A secure circuit board assembly is provided. The secure circuit board assembly comprises: a control board including a cryptographic processor; a spacer portion mounted on the control board; and a lid mounted on the spacer portion. The control board, the spacer portion, and the lid collectively provide a secure enclosed chamber in which the cryptographic processor is mounted. The spacer portion provides protection against side-on attacks against the cryptographic processor.

17 Claims, 6 Drawing Sheets

Space for a track

SECURE CIRCUIT BOARD ASSEMBLY

FIELD OF INVENTION

The present invention relates to a secure circuit board assembly. In particular, though not exclusively, the invention relates to a secure circuit board assembly for mounting a cryptographic processor.

BACKGROUND OF INVENTION

Cryptographic processors are used in secure devices, such as encrypting keypads and encrypting touch-sensitive displays, to ensure that data entered via the secure device is transmitted only in encrypted form when it leaves the secure device.

There are various requirements to be met for a secure device to be compliant with international security standards. One such standard is set by the PCI Security Standards Council.

One potential attack on a secure device is a side-on attack, which involves an attempt to probe a cryptographic processor from the side of the secure device rather than from the top or bottom of the secure device. Prior art secure devices have attempted to mitigate against such attacks by surrounding the cryptographic processor with a conducting mesh, and embedding the conducting mesh in epoxy. However, this approach has not been entirely successful, being unreliable, time consuming and relatively expensive.

SUMMARY OF INVENTION

Accordingly, the invention generally provides methods, systems, and apparatus for protecting a secure device, particularly from side-on attacks.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a secure circuit board assembly comprising a control board including a cryptographic processor; a spacer portion mounted on the control board; and a lid mounted on the spacer portion, so that the control board, the spacer portion, and the lid collectively provide a secure enclosed chamber in which the cryptographic processor is mounted.

The spacer portion may comprise a separate circuit board, or additional layers on the control board.

The spacer portion may include alternate layers linked to form a conducting path, so that any breach of any part of this path is detected by the cryptographic processor. For example, layers one, three, and five may be coupled together at a positive voltage (such as 3.3V); and layers two, four, and six may be coupled together at electrical earth (0V). The conducting paths may be located around a perimeter of the spacer portion; or around the entire spacer portion where the spacer portion is in the form of a frame in registration with a perimeter of the control board.

The path defined by adjacent layers may be offset to restrict the possibility of even a narrow penetration managing to avoid adjacent layers.

The spacer portion may define a plurality of apertures. One aperture may provide support for an elastomeric connection, such as a Zebra (trade mark) elastomeric connection, available from Fujipoly America Corporation, 900 Milik Street, P.O. Box 119, Carteret, N.J. 07008, USA. An elastomeric connection operates by abutting spaced, opposing, conducting pads (typically in the form of two linear strips of pads) and being held in compression by the opposing conducting pads to maintain a close connection between each side of the elastomeric connection and the conducting pads.

Another aperture may surround the cryptographic processor. Another aperture may surround a touch-sensitive panel controller. Yet another aperture may be aligned with a recessed portion to define a split-level path for a flexible connector to indicate removal of the secure circuit board assembly (or a secure device including the secure circuit board) from an installation, such as a self-service terminal.

A spacer portion side of the control board and a control board side of the spacer portion may each include two or more pads, the pads on the spacer portion side of the control board being in registration with the pads on the control board side of the spacer portion, such that corresponding pads are in contact when the spacer portion is mounted to the control board. One or more of these pads may protrude from a surface on which they are disposed to provide a better contact with a corresponding pad.

One pad may convey a positive voltage (the positive pad), the other pad may convey electrical earth (or ground) (the ground pad). There may be a plurality of positive pads and a plurality of ground pads. The pads on either (or both) the control board and the spacer portion may be configured as insulated concentric circles. An inner circle may be used to convey the required voltage (ground or positive), and a concentric outer circle may be provided with the other voltage (that is, positive or ground), so that if a third party attempts to place a conducting foil or probe between the spacer portion and the control board, then the conducting foil or probe will create a short between the inner and outer circles, which will be detected by the cryptographic processor. Since only the inner circle conveys the required voltage, the corresponding pad only needs to be in registration with this inner circle, and electrically insulated from the outer circle.

The positive pad may be coupled to the first group of alternate layers linked to form a first conducting path; and the ground pad may be coupled to the second group of alternate layers linked to form a second conducting path.

A lid side of the spacer portion and a spacer portion side of the lid may each include two or more pads, the pads on the lid side of the spacer portion being in registration with the pads on the spacer portion side of the lid, such that corresponding pads are in contact when the spacer portion is mounted to the lid. One pad may convey a positive voltage (the positive pad), the other pad may convey electrical earth (or ground) (the ground pad). There may be a plurality of positive pads and a plurality of ground pads. The pads on either (or both) the lid side of the spacer portion or the spacer portion side of the lid may be configured as insulated concentric circles. An inner circle may be used to convey the required voltage (ground or positive), and a concentric outer circle may be provided with the other voltage (that is, positive or ground), so that if a third party attempts to place a conducting foil between the spacer portion and the control board, then the conducting foil will create a short between the inner and outer circles, which will be detected by the cryptographic processor, or the foil will separate the pads on the lid side of the spacer portion from the pads on the spacer portion, which will be detected by the cryptographic processor.

One or more ground pads and/or positive pads on the lid side of the spacer portion may comprise two insulated semi-circles electrically connected by a corresponding ground or positive pad (respectively) on the spacer portion side of the lid. This ensures that if the lid is lifted from the spacer portion, then the two semi-circles will become open circuited, which will be detected by the cryptographic processor.

The control board may include a plurality of components surrounding the cryptographic processor and/or a touch-sensitive panel controller. The plurality of components may include low value (for example, zero ohm) resistors, ferrites, or the like. Any side attack may damage these components, thereby breaking the electrical continuity of the circuit, which will be detected by the cryptographic processor.

The spacer portion may comprise a plurality of layers permanently bonded to the control board; that is, the control board and spacer portion may comprise an integral unit that is not designed for disassembly. Alternatively, the spacer portion may comprise a separate board that abuts the control board and is held in place by screws, bolts, or the like.

As another option, additional spacer portions may be provided, so that each spacer portion is a separate board. A first spacer portion may include a first connecting pad strip in registration with a connecting pad strip on a spacer portion side of the lid, but separated therefrom by a second spacer portion, the second spacer portion defining an aperture to accommodate an elastomeric connector for providing electrical continuity between the two connecting pad strips.

The second spacer portion may include a second connecting pad strip in registration with a connecting pad strip on a spacer portion side of the control board (the control board pad strip), but separated therefrom by the first spacer portion, the first spacer portion defining an aperture to accommodate an elastomeric connector for providing electrical continuity between the second and control board pad strips. The apertures defined by the first and second spacer portions may be offset from each other.

According to a second aspect there is provided a secure device including the secure circuit board of the first aspect of the invention.

The secure device may further include a removal strip coupled to the secure circuit board at one end and having a switch at an opposite end for clamping in a host device, so that the switch is closed (or open) when the removal strip is clamped.

The secure device may be operable to detect a change of state of the switch, thereby detecting removal of the secure device from the host device.

The host device may be a self-service terminal.

The secure device may comprise an assembled secure circuit board mounted in a housing.

According to a third aspect there is provided a self-service terminal including the secure device of the second aspect.

The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

These and other aspects will be apparent from the following specific description, given by way of example, with reference to the accompanying drawings.

DETAILED DESCRIPTION

Figure 1:
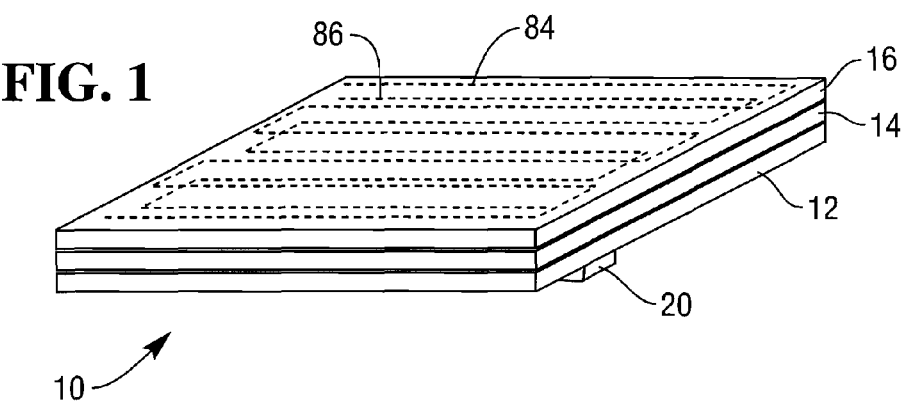
FIG. 1 is a simplified pictorial diagram of a secure circuit board assembly comprising three different boards, according to one embodiment of the present invention.
Figure 2:
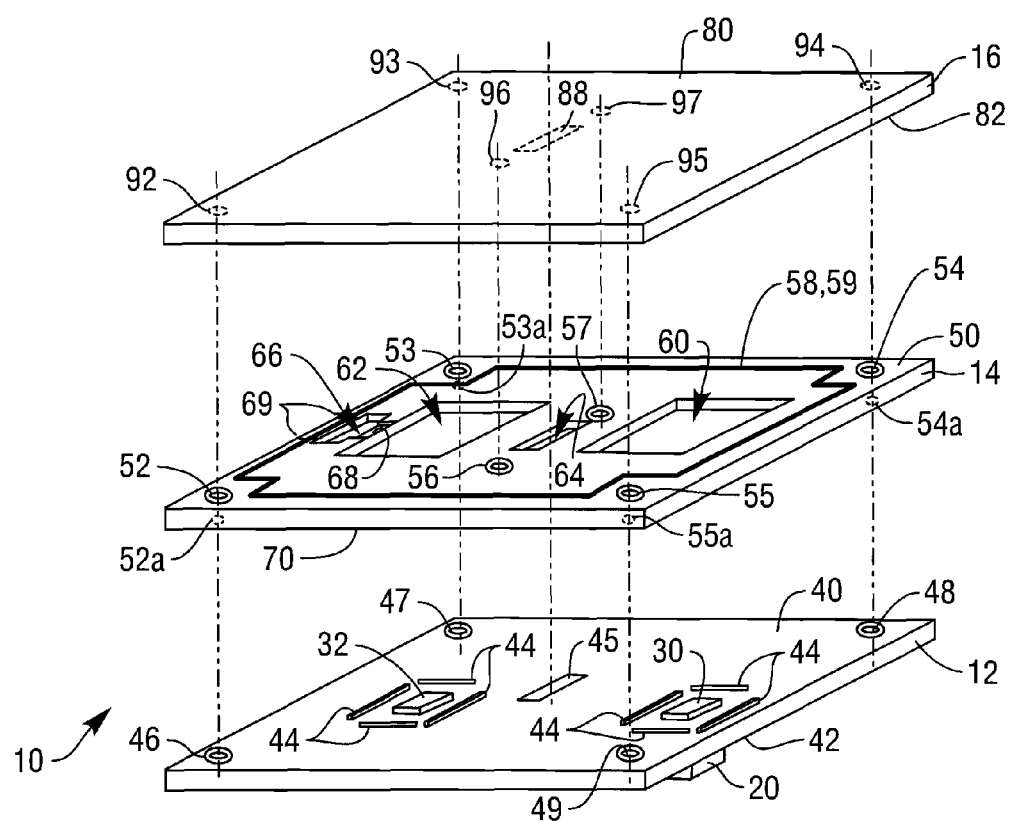
FIG. 2 is an exploded view of the secure circuit board assembly of FIG. 1, illustrating the three different boards.

Reference will first be made to FIG. 1, which is a pictorial diagram of a secure circuit board assembly 10 according to one embodiment of the present invention, and also to FIG. 2, which is an exploded view of the secure circuit board assembly 10.

The secure circuit board assembly 10 comprises a control board layer 12, a spacer portion 14, and a secure lid 16. The control board 12, spacer portion 14, and secure lid 16 are each in the form of a multi-layer printed circuit board (pcb). In this embodiment, the control board 12 comprises an eight layer 1.6 mm thick FR4 pcb; the spacer portion 14 comprises an eight layer 2 mm thick FR4 pcb; and the secure lid 16 comprises a four layer 1.6 mm FR4 pcb. A USB connector 20 is mounted on an underside of the control board 12 to connect the secure circuit board assembly 10 to a controller (not shown). A touch panel connector (not shown) is also mounted on the underside of the control board 12 to connect the secure circuit board assembly 10 to a touch panel (not shown).

Control Board Layer 12

The primary purposes of the control board 12 are as follows. Firstly, to support components (on each of the two external surfaces of the control board 12); in particular, secure components (such as a cryptographic processor 30, and a touch-sensitive panel controller 32) are supported on an inward-facing surface 40 (also referred to as a spacer portion side), and non-secure components (such as one or more batteries, power supply components, the USB connector 20, and the like) are supported on an outward-facing surface 42. Secondly, to prevent any attacks on the secure components via the outward-facing surface 42, as will be described in more detail below.

The control board 12 also includes redundant components 44, in the form of low resistance resistors and ferrite components. The redundant components 44 are arranged on the control board inward-facing surface 40 to surround the cryptographic processor 30 and the touch-sensitive panel controller 32. In the event that any of these components are damaged, for example by a probe penetrating them in an attempt to reach the cryptographic processor 30, then the cryptographic processor 30 detects this and can delete any secure information stored within the cryptographic processor 30 or elsewhere on the secure circuit board 12.

Figure 4A:
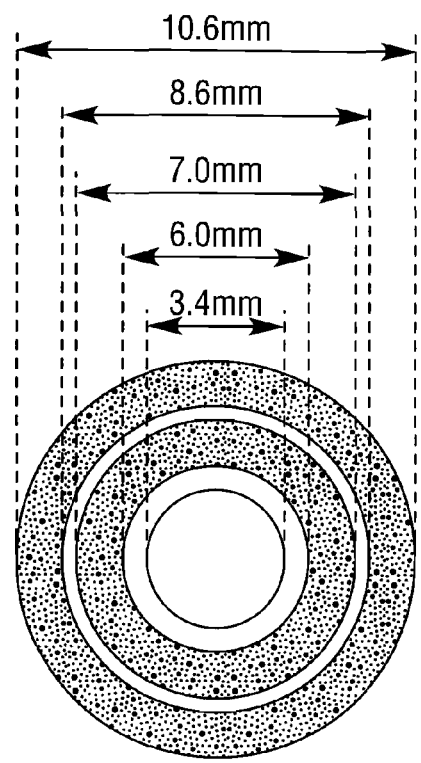
FIGS. 4A to 4C are pictorial diagrams illustrating three types of pads used on the three different boards of FIG. 1.

The control board 12 also includes a linear strip 45 of conducting pads approximately centrally located thereon; and four conducting pads 46 to 49 disposed adjacent four corners of the control board 12. The four conducting pads 46 to 49 each comprise a pair of insulated concentric circles, as illustrated in FIG. 4A. One circle in each pair of circles is maintained at a positive voltage (3.3V) and the other circle is maintained at electrical earth. Only the inner circle is used to transfer power (3.3V) or earth, the outer circle is maintained at the opposite voltage so that any attempt to probe the inner circle will short circuit the outer and inner circles, which will be detected by the cryptographic processor 30. In this embodiment, the inner circles of conducting pads 46 and 48 are maintained at electrical earth; whereas the inner circles of conducting pads 47 and 49 are maintained at the positive voltage (3.3V).

The outward-facing surface 42 also includes a removal switch (not shown) for indicating when the circuit board 12 is removed from a touch sensitive display (not shown).

Although not shown, the control board 12 also contains two conducting tracks, each track linking alternate layers of the control board 12. One conducting track (at 3.3V) traverses the even layers, doubling back on itself as it extends over each layer; the other conducting track (at electrical earth) traverses the odd layers, doubling back on itself as it extends over each layer. These conducting tracks are used to prevent any attacks through the outward-facing surface 42 to the inward-facing surface 40.

Spacer Portion Layer 14

The primary purposes of the spacer portion 14 are (i) to provide protection against any side-on attacks against the cryptographic processor 30, the touch-sensitive panel controller 32, and other secure components, and (ii) to provide a sufficient gap between the control board 12 and secure lid 16 to allow for the height of the secure components (such as the cryptographic processor 30 and the touch-sensitive panel controller 32). To achieve these purposes, the spacer portion 14 comprises an eight layer pcb, in this embodiment.

The spacer portion 14 includes a lid-facing layer 50 (the first layer) having six conducting pads 52 to 57, and two perimeter conducting tracks 58,59.

Figure 4B:
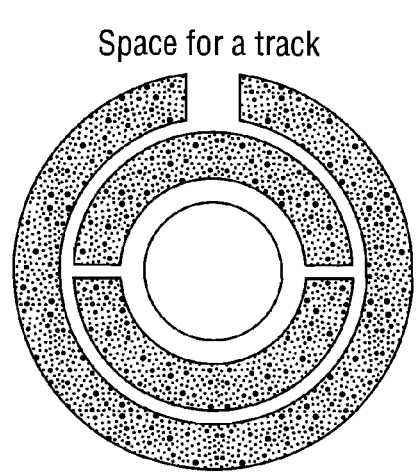

Four of the conducting pads 52,53,56,57 each comprise a pair of concentric circles of the type illustrated in FIG. 4A, which is the same type as for conducting pads 46 to 49. However, two of the conducting pads 54,55 each comprise an outer circle surrounding a pair of arcuate portions (almost semi-circles), where each arcuate portion is insulated from the other arcuate portion and the outer circle, as illustrated in FIG. 4B.

The perimeter conducting track 58 is maintained at a positive voltage (3.3V in this embodiment) and covers approximately the outer ten millimeters of the layer, not including the conducting pads 52 to 55, which are isolated from the conducting track 58. The perimeter conducting track 58 winds around the perimeter in the plane of the first layer 50, with a narrow pitch between adjacent portions of the single conducting track 58, then continues on the third layer (not shown), then the fifth layer (not shown) and the seventh layer (not shown) of the spacer portion 14. Thus, the perimeter conducting track 58 snakes around four alternate layers, and then couples to an inner circle of the conducting pad 56. As will be explained below, when assembled, this connects the conducting track 58 to the cryptographic processor 30, which can detect if any part of the conducting track 58 is broken, for example, as part of a side-on attack.

Similarly, the perimeter conducting track 59 is maintained at electrical earth and winds around the perimeter in the plane of the second layer, with a narrow pitch between adjacent portions of the single conducting track 58, then continues on the fourth layer (not shown), then the sixth layer (not shown), and the eighth layer (not shown) of the spacer portion 14. Thus, the ground perimeter conducting track 59 snakes around four alternate layers, and then couples to an inner circle of the conducting pad 57. As will be explained below, when assembled, this connects the conducting track 59 to the cryptographic processor 30, which can detect if any part of the conducting track 59 is broken, for example, as part of a side-on attack. The cryptographic processor 30 can also detect if the secure circuit board assembly 10 is disassembled, because this creates an open circuit condition between conducting pads that are in contact when the secure circuit board assembly 10 is properly assembled.

The ground perimeter conducting track 59 is laterally offset from the positive perimeter conducting track 58 to reduce the possibility of a probe being inserted between adjacent track portions. The pitch between adjacent portions is typically selected as the narrowest pitch that pcb manufacturing technology will conveniently permit.

The spacer portion 14 also defines four apertures and two recesses. The first aperture 60 provides space for the cryptographic processor 30 and associated components; the second aperture 62 provides space for the touch-sensitive panel controller 32 and associated components; the third aperture 64 provides space for, and supports in place, an elastomeric connector (not shown) that abuts the linear strip 45; and the fourth aperture 66 is located between a first recess 68 (on the first layer 50) and a second recess 69 (located on the sixth layer 70 and indicated by broken lines). The fourth aperture 66 provides a split level channel through which a removal flex can be routed. Having a split level channel means that it is difficult to insert a conductor from outside the secure circuit board assembly 10 to probe pads (not shown) or short circuit a connector to which the removal flex is coupled.

Figure 4C:
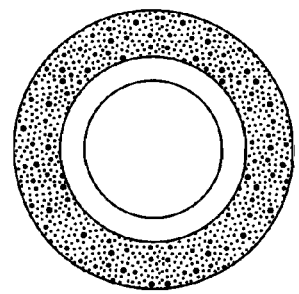

Each of the four conducting pads 52 to 55, has a corresponding conducting pad, 52a to 55a respectively, disposed on the eighth layer 70 (the control board facing side). These conducting pads 52a to 55a are of the type illustrated in FIG. 4C, and comprise only an inner circle. The inner circles of conducting pads 52a to 55a are electrically connected to the inner portions (either circles for conducting pads 52 and 53, or one of the arcuate portions of conducting pads 54 and 55) of the corresponding conducting pads 52 to 55. This allows power (3.3V) or earth to be routed through the spacer portion 14 of the secure circuit board assembly 10.

Secure Lid 16

The primary purposes of the secure lid 16 are (i) to cover the secure components, and (ii) to protect against any attacks on the secure components via the secure lid 16. To achieve this, in this embodiment the secure lid 16 comprises a four layer pcb, having an outer surface 80 (the first layer) and an inner surface 82 (the fourth layer). Two conducting tracks 84,86 (shown on FIG. 1) are routed between these (first and fourth) layers.

The first conducting track 84 is maintained at a positive voltage (3.3V in this embodiment) and winds its way across a second layer of the secure lid 16 located beneath the outer surface 80. The second conducting track 86 is maintained at ground (electrical earth) and winds its way across a third layer of the secure lid 16 located between the second layer and a fourth layer (the inner surface 82). The first and second conducting tracks 84,86 are laterally offset to make it more difficult to insert a probe from the outer surface 80 to the inner surface 82 without touching one of the two conducting tracks 84,86.

The inner surface 82 includes a centrally-located linear strip 88 of conducting pads that aligns with the third aperture 64 in the spacer portion 14, and the linear strip 45 on the control board 12, so that when the boards are assembled an elastomeric connector abuts the linear strips 45,88 and is maintained in position by the third aperture 64. In this embodiment, the elastomeric connector is a Zebra (trade mark) strip, available from Fujipoly America Corporation, 900 Milik Street, P.O. Box 119, Carteret, N.J. 07008, USA.

The two conducting tracks 84,86 are connected to different portions of the linear strip 88.

The inner surface 82 also includes six conducting pads 92 to 97 disposed in registration with the corresponding conducting pads 52 to 57 on the lid-facing layer 50. The six conducting pads 92 to 97 are of the type illustrated in FIG. 4C, and comprise only an inner circle.

Figure 3:
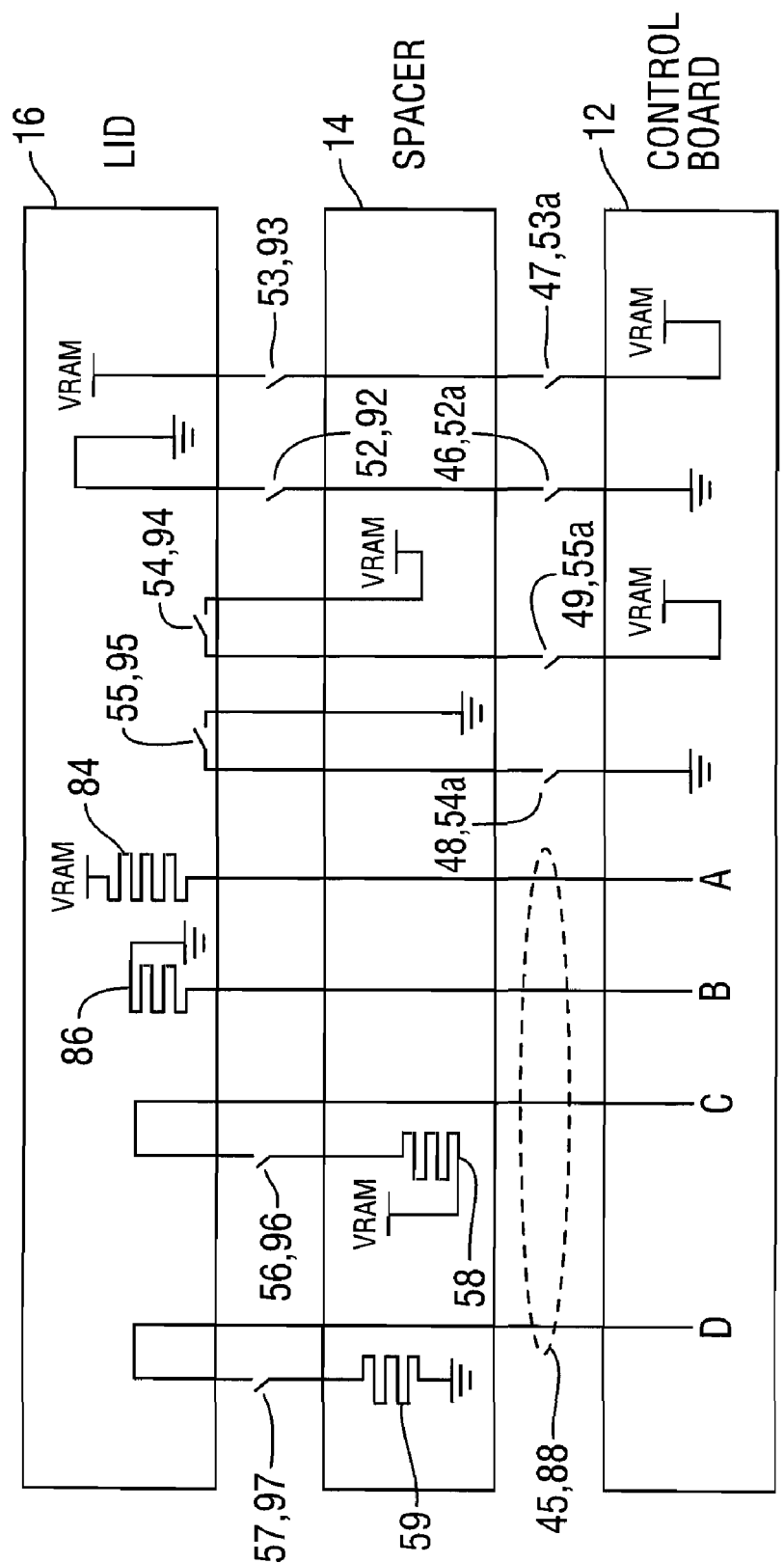
FIG. 3 is a schematic diagram of electrical connections between the three different boards of FIG. 1.

When the three different boards 12,14,16 are assembled, the conducting pads 46 to 49, 52 to 57, 52*a* to 55*a*, and 92 to 97, and the linear strips 45,88 form closed switches, as illustrated in FIG. 3. Any attempt to dismantle these boards, or to insert a probe between the boards to reach the secure chambers defined by apertures 60,62, will be detected by the cryptographic processor 30. This occurs because one of the conducting tracks 58,59,84,86 will be short or open circuited by the probe, or conducting pads that are in contact will be separated (thereby creating an open circuit), or short circuited.

Figure 5:
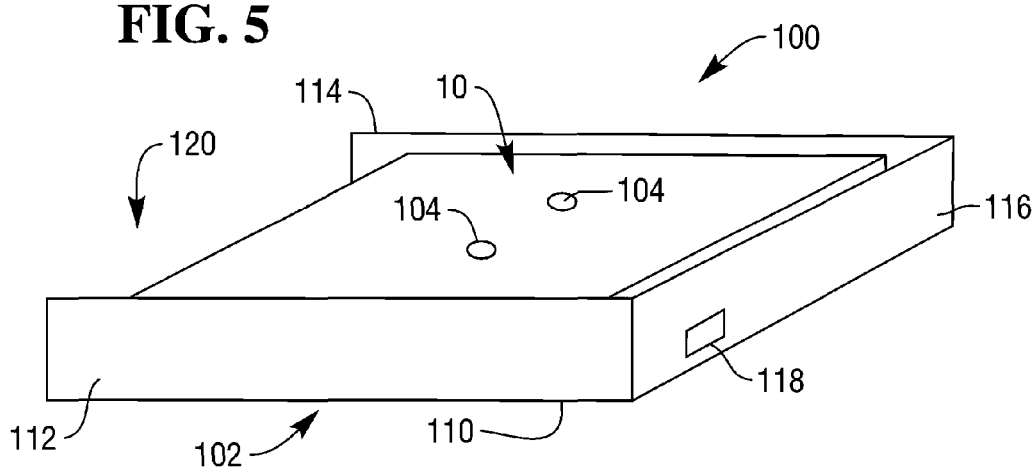
FIG. 5 is a schematic diagram of the secure circuit board assembly of FIG. 1 mounted in a housing to create an assembled secure circuit board.

Reference will now also be made to FIG. 5, which is a schematic diagram of an assembled secure circuit board 100 comprising the secure circuit board 10 mounted in a housing 102. The housing 102 facilitates assembly of the secure circuit board 10 by providing threaded hollow spigots (not shown) in registration with circular apertures (not shown) defined by each of the three different boards. Screws 104 can be inserted through the circular apertures (not shown) and driven into the threaded spigots (not shown). These screws 104 maintain corresponding conducting pads (for example, conducting pads 52 and 92) in close contact. If the screws 104 are removed, or even loosened, then the conducting pads will be separated, causing an open circuit condition.

The housing 102 comprises folded sheet metal with punched apertures. The housing 102 has a base 110 covering the outward-facing surface 42 and defining an aperture (not shown) in registration with the removal switch (not shown) on the outward-facing surface 42. Three sides 112,114,116 are folded up from the base 110 to protect the sides of the secure circuit board assembly 10. One of these sides 116 defines a USB connector aperture 118 in registration with the USB connector 20. A fourth side 120 is left open to provide access to the touch panel connector (not shown) and the split level channel 66.

Figure 6:
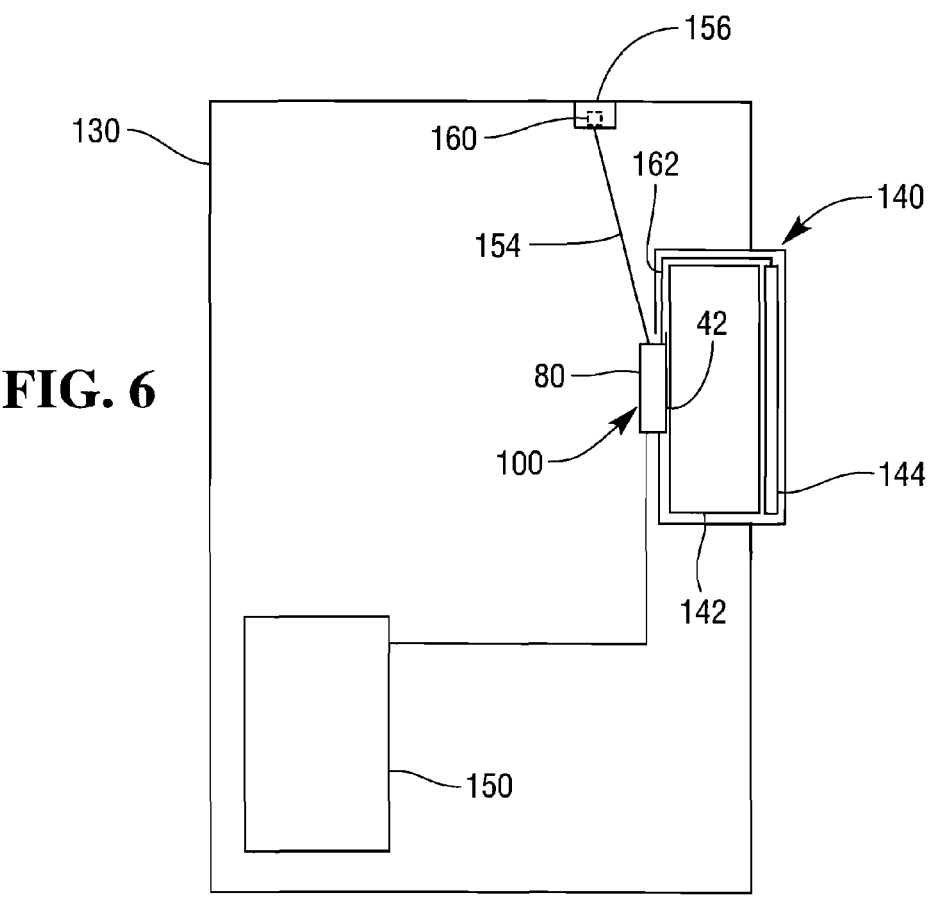
FIG. 6 is a schematic diagram of a secure device incorporating the assembled secure circuit board of FIG. 5.

Reference will now also be made to FIG. 6, which is a schematic diagram of a secure device 130 (in the form of an ATM) incorporating the assembled secure circuit board 100 coupled to a touch sensitive display assembly 140 via its outward-facing surface 42. The touch sensitive display assembly 140 comprises a display 142 and a transparent touch-sensitive panel 144 in registration with and overlying the display 142.

The assembled secure circuit board 100 is electrically and physically coupled to a controller 150 in the ATM 130 via the USB connector 20. The assembled secure circuit board 100 is also physically tethered to the ATM 130 by a removal flex 154, which is held within a clamp 156. The removal flex 154 includes a switch 160 that open circuits when released from the clamp 156. When the switch 160 open circuits, then this is detected by the cryptographic processor 30. The assembled secure circuit board 100 is also electrically connected to the touch-sensitive panel 144 by a secure touchscreen flex 160.

It will now be appreciated that the assembled secure circuit board 100 provides protection against attacks from its lower surface (the outward-facing surface 42), its upper surface 80, and its sides.

Second Embodiment

Figure 7:
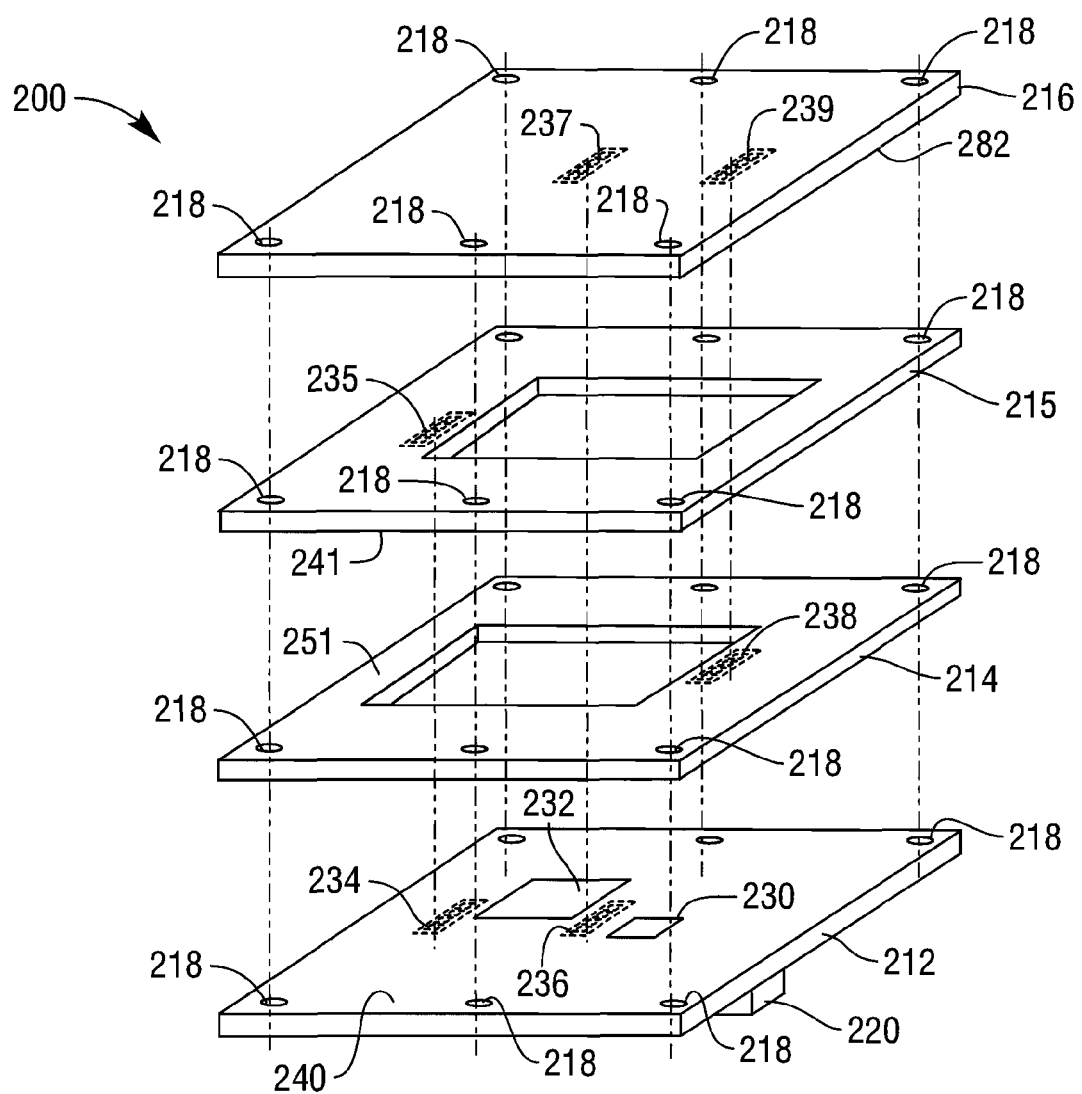
FIG. 7 is an exploded view of a secure circuit board assembly according to a second embodiment of the present invention.

Another embodiment of the present invention will now be described with reference to FIG. 7, which is an exploded view of a secure circuit board assembly 200 according to a second embodiment of the present invention.

The secure circuit board assembly 200 comprises four separate boards, namely: a control board layer 212, a first spacer portion 214, a second spacer portion 215, and a secure lid 216. The control board 212, spacer portions 214,215 and secure lid 216 are each in the form of a multi-layer printed circuit board (pcb). Each of the four boards defines six apertures 218 through which screws (not shown) can be inserted to mount the four boards to a housing (not shown) in a similar way to the first embodiment.

In a similar way to the first embodiment, the control board 212 is populated with a USB connector 220, a cryptographic processor 230, a touch-sensitive panel controller 232 and various other components required or desirable for implementing an encryption function.

Each of the four boards 212,214,215,216 includes conducting tracks and the like to route power, earth, and signals through the boards. The four boards are connected by three elastomeric connectors (not shown) in the form of Zebra (trade mark) strips.

The first elastomeric connector (not shown) couples a linear strip 234 on an inner surface 240 of the control board 212 to a linear strip 235 on a lower surface 241 of the second spacer portion 215.

The second elastomeric connector (not shown) couples a linear strip 236 on the inner surface 240 of the control board 212 to a linear strip 237 on a lower surface 282 of the secure lid 216.

The third elastomeric connector (not shown) couples a linear strip 238 on an upper surface 251 of the first spacer portion 214 to a linear strip 239 on the lower surface 282 of the secure lid 216.

These three elastomeric connectors mutually coupled the four boards 212,214,215,216. Elastomeric connectors provide a contact connection that relies on the elastomeric connector being compressed. This means that if the screws (not shown) through apertures 218 are loosened, then the elastomeric connectors will no longer connect the four boards, which would be detected by the cryptographic processor 230, thereby enabling the cryptographic processor 230 to delete any secure or sensitive information, such as encryption keys stored therein.

Third Embodiment

Figure 8:
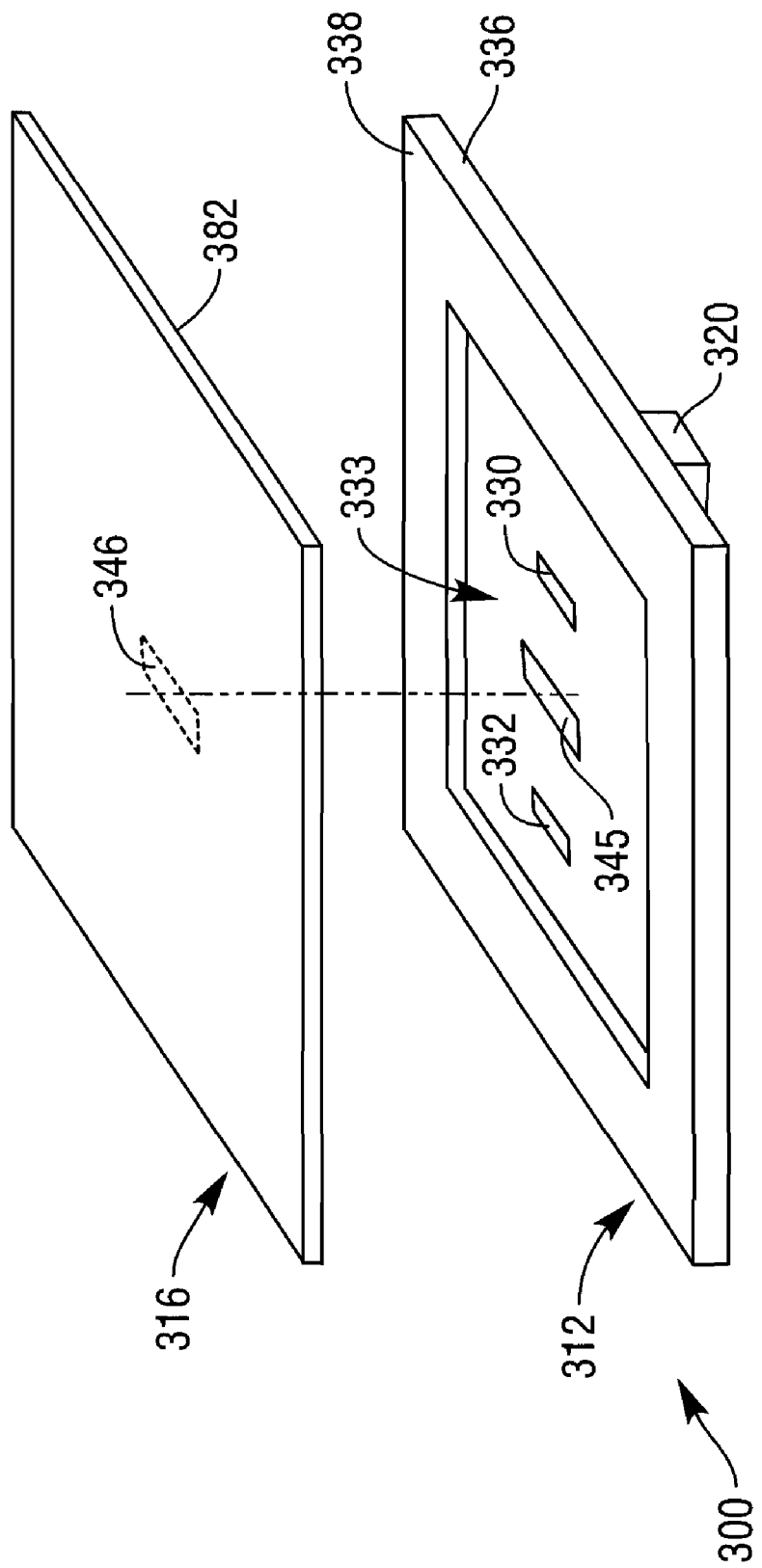
FIG. 8 is an exploded view of a secure circuit board assembly according to a third embodiment of the present invention.

Another embodiment of the present invention will now be described with reference to FIG. 8, which is an exploded view of a secure circuit board assembly 300 according to a third embodiment of the present invention.

The secure circuit board assembly 300 comprises a control board layer 312 and a secure lid 316.

In a similar way to the first and second embodiments, the control board 312 is populated with a USB connector 320, a cryptographic processor 330, a touch-sensitive panel controller 332 and various other components required or desirable for implementing an encryption function.

Unlike the first and second embodiments, the control board 312 defines a large recess 333, which co-operates with the secure lid 316 to create a secure chamber in which the cryptographic processor 330 and touch-sensitive panel controller 332 are housed. The recess 333 is defined by a plurality of lower layers 336 of FR4 circuit board, in this embodiment two layers (approximately 1.6 mm thick in total), on which a plurality of higher layers 338, in this embodiment six layers (approximately 2.0 mm thick in total), are disposed in the shape of a frame around the perimeter of the lower layers 336. Thus, the total height of the control board 312 is approximately 3.6 mm.

A linear strip 345 is located near the centre of the control board 312 in registration with a linear strip 346 mounted on an underside 382 of the secure lid 316, so that an elastomeric connector (not shown) can coupled the control board 312 to the secure lid 316 when the control board 312 and secure lid 316 are held together.

In a similar manner to the first and second embodiments, the lower and higher layers 336,338 and the secure lid 316 include conducting tracks that are connected to the cryptographic processor 330 and routed through the elastomeric connector (not shown). Conducting tracks may be routed from one layer to the next layer by hidden vias.

It will now be appreciated that each of these three embodiments provides at least one secure chamber in which secure components can be located. Any disassembly of the circuit boards will cause one or more open circuits, which will be detected by a secure component (the cryptographic processor), thereby enabling the secure component to delete any sensitive information or take any other appropriate protective action.

Various modifications may be made to the above described embodiment within the scope of the invention, for example, in other embodiments, the voltages, or polarities, used may differ from those described above.

In other embodiments, the pcbs used for the control board, the spacer portion or portions, and the secure lid may comprise different layers to those described in the above embodiments. For example, in embodiments similar to the first embodiment, the spacer portion 14 may comprise more or fewer than eight layers.

The number of layers chosen may depend on the requirements of a specific application.

The secure circuit board assembly may be mounted in a different housing to that described above.

An assembled secure circuit board may be included in a different terminal to that described, or to a different self-service terminal to that described.

In other embodiments, the values or polarities of the voltages used may be different to those described above. For example, instead of a positive voltage and earth, earth and a negative voltage may be used, or a negative and a positive voltage may be used.

In other embodiments, the conducting tracks may include positive voltage and earth tracks interwoven on the same layer.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A secure circuit board assembly comprising:
a control board including (i) a cryptographic processor, and (ii) a plurality of redundant components surrounding the processor and forming an electrical circuit which, when damaged by a side attack on the control board, breaks electrical continuity of the redundant components of the electrical circuit;
a spacer portion mounted on the control board; and
a lid mounted on the spacer portion, so that the control board, the spacer portion, and the lid collectively provide a secure enclosed chamber in which the cryptographic processor is mounted.

2. A secure circuit board assembly according to claim 1, wherein the spacer portion comprises a separate circuit board.

3. A secure circuit board assembly according to claim 1, wherein the spacer portion comprises additional layers on the control board.

4. A secure circuit board assembly according to claim 1, wherein the spacer portion includes alternate layers linked to form a conducting path, so that any breach of any part of this path is detected by the cryptographic processor.

5. A secure circuit board assembly according to claim 1, wherein the spacer portion defines a plurality of apertures, including a first aperture to provide support for an elastomeric connection and a second aperture to surround the cryptographic processor.

6. A secure circuit board assembly according to claim 5, wherein the spacer portion defines a third aperture to surround a touch-sensitive panel controller and a fourth aperture aligned with a recessed portion to define a split-level path for a flexible connector to indicate removal of the secure circuit board assembly.

7. A secure circuit board assembly comprising:
a control board including a cryptographic processor;
a spacer portion mounted on the control board; and
a lid mounted on the spacer portion, so that the control board, the spacer portion, and the lid collectively provide a secure enclosed chamber in which the cryptographic processor is mounted;
wherein (i) the spacer portion includes a first conducting track and a second conducting track which is laterally offset from the first conducting track to reduce possibility of a probe being inserted between adjacent track portions, and (ii) a spacer portion side of the control board and a control board side of the spacer portion each include two or more pads, the pads on the spacer portion side of the control board being in registration with the pads on the control board side of the spacer portion, such that corresponding pads are in contact when the spacer portion is mounted to the control board.

8. A secure circuit board assembly according to claim 1, wherein the plurality of redundant components includes a plurality of redundant low value resistors so that any side attack that damages the plurality of redundant low value resistors will be detected by the cryptographic processor.

9. A secure circuit board assembly according to claim 1, wherein the spacer portion comprises a plurality of layers permanently bonded to the control board.

10. A secure device comprising:
a secure circuit board assembly comprising (i) a control board including a cryptographic processor, (ii) a spacer portion mounted on the control board, and (iii) a lid mounted on the spacer portion, so that the control board, the spacer portion, and the lid collectively provide a secure enclosed chamber in which the cryptographic processor is mounted; and a removal strip coupled to the secure circuit board assembly at one end and having a switch at an opposite end for clamping in a host device, so that the switch changes state when the removal strip is unclamped and thereby to provide the cryptographic processor with an electrical signal indicative of the removal strip being unclamped in the host device.

11. A secure device according to claim 10, wherein the secure device comprises an assembled secure circuit board mounted in a housing.

12. A self-service terminal including the secure device according to claim 10.

13. A self-service terminal according to claim 12, wherein the self-service terminal further comprises a cash dispenser.

14. A self-service terminal according to claim 12, wherein the self-service terminal further comprises a touch-sensitive panel overlying a display for allowing users to enter a personal identification number via the touch-sensitive panel.

15. A secure circuit board assembly according to claim 1, wherein the plurality of redundant components includes a plurality of redundant ferrite components so that any side attack that damages the plurality of redundant ferrite components will be detected by the cryptographic processor.

16. A secure circuit board assembly according to claim 7, wherein the lid includes a third conducting track and a fourth conducting track which is laterally offset from the third conducting track to reduce possibility of a probe being inserted between adjacent track portions.

17. A secure device according to claim 11, wherein the housing includes a number of threaded hollow spigots in registration with circular apertures defined by each of the control board, the spacer portion, and the lid so that a number of screws can be inserted through the circular apertures to maintain corresponding conducting pads in electrical contact with each other and thereby to provide an open circuit condition when the screws are removed.

* * * * *